(No Model.)
W. SCHMIDT.
BRAKE FOR BICYCLES, &c.
No. 577,665. Patented Feb. 23, 1897.
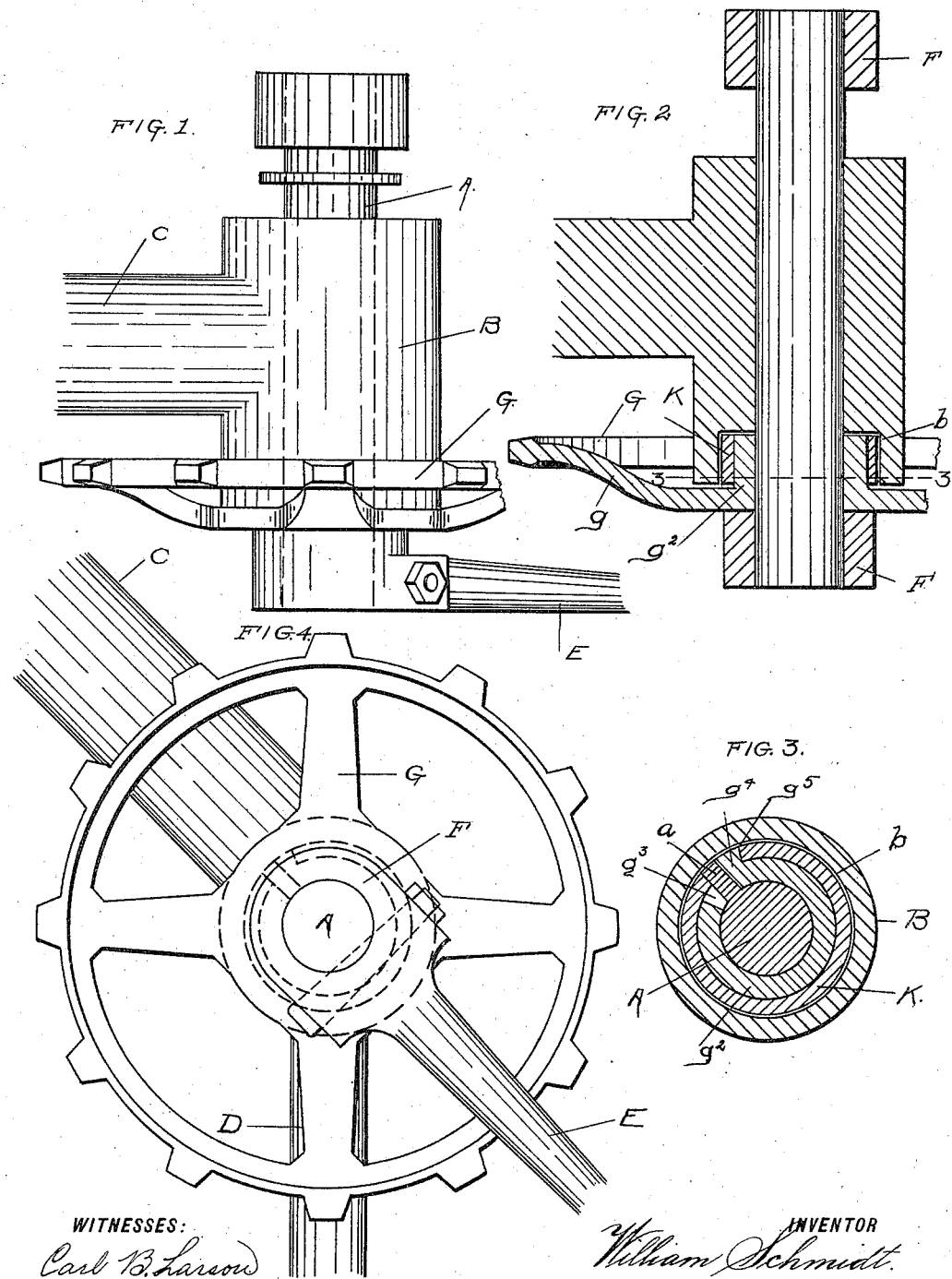

UNITED STATES PATENT OFFICE.

WILLIAM SCHMIDT, OF BROOKLYN, NEW YORK.

BRAKE FOR BICYCLES, &c.

SPECIFICATION forming part of Letters Patent No. 577,665, dated February 23, 1897.

Application filed February 21, 1896. Serial No. 580,208. (No model.)

*To all whom it may concern:*

Be it known that I, WILLIAM SCHMIDT, a citizen of the United States, and a resident of Brooklyn, in the county of Kings and State of New York, have invented certain new and useful Improvements in Brakes for Bicycles and Similar Articles, of which the following is a specification, reference being had to the accompanying drawings, forming a part thereof, in which similar letters of reference indicate corresponding parts.

This invention relates to brakes for bicycles and similar vehicles; and the object thereof is to provide an improved device of this class which is simple in construction and operation, a further object being to provide a brake which operates in connection with the sprocket-wheel of the pedal-shaft and the hub of the frame through which the pedal-shaft passes.

The invention is fully disclosed in the following specification, of which the accompanying drawings form a part, in which—

Figure 1 is a partial plan view of the pedal-shaft, the hub of the frame of the vehicle through which the same passes, and the sprocket-wheel which is mounted thereon; Fig. 2, a longitudinal section thereof; Fig. 3, a transverse section on the line 3 3 of Fig. 2, and Fig. 4 a side view of the construction shown in Fig. 1.

In the drawings forming part of this specification, A represents the pedal-shaft of a bicycle or similar vehicle, and B the hub of the frame through which the pedal-shaft passes, and C and D represent parts of said frame.

The pedal-cranks, one of which is shown at E, are connected with the pedal-shaft by means of tubular heads F or in any desired manner, and one end of the hub B is provided with an annular chamber $b$, and formed on one side of the pedal-shaft A is a radial shoulder or projection $a$, which extends across said annular chamber.

The sprocket-wheel G is provided with radial spokes $g$, which are outwardly curved, as shown in Figs. 1 and 2, and which connect with a tubular hub $g^2$, which is open at one side, as shown at $g^3$ in Fig. 3, and one side of which is provided with a shoulder or projection $g^4$, which extends outwardly even with the shoulder or projection $a$, formed on the pedal-shaft, and across the annular chamber $b$ on the tubular hub B. I also employ a brake K, which consists of an open spring-ring, which is placed within the annular chamber $b$ and between the hub $g^2$ of the sprocket-wheel and the outer walls of said annular chamber, and one end thereof presses against the shoulder or projection $g^4$, formed on the hub $g^2$, and the other end thereof presses upon or rests against the shoulder or projection $a$, formed on the pedal-shaft A.

The outer wall of the shoulder or projection $g^4$, formed on the hub $g^2$, is inwardly beveled or inclined, as clearly shown at $g^5$, and the corresponding end of the brake-spring K is similarly formed, and the operation will be readily understood from the foregoing description when taken in connection with the accompanying drawings and the following statement thereof.

It will be apparent that the shaft A when revolved by the pedal-crank in the forward direction or in the direction of propelling the vehicle forward will carry around with it the hub of the sprocket-wheel and also the brake-spring K, these parts moving freely and normally and the hub and brake-spring being carried around by the shoulder or projection $a$ on the pedal-shaft.

If at any time it is desired to stop the machine or brake the same, it is only necessary to press backwardly on the pedals, so as to check the movement thereof and cause the shoulder or projection $a$ on the pedal-shaft to press against the adjacent end of the brake-spring K. This operation, as will be apparent, will expand said spring and cause the same to press upon the walls of the annular chamber $b$, and this operation will act as a brake to check the vehicle and finally stop the same.

It will be observed that the opening in the hub $g^2$ of the sprocket-wheel through which the shoulder or projection $a$ on the pedal-shaft passes is much wider than said shoulder or projection, and when reversed pressure is applied to the shaft the shoulder or projection $a$ presses upon the end of the brake-spring adjacent thereto and not upon the side of the hub, while when the pedal-shaft is revolved in the forward direction, or so as to propel the vehicle in the forward direction, the shoulder or projection $a$ on the pedal-shaft presses directly upon the side of the hub of the sprocket-wheel. By reason of this construction the least pressure applied reversely on the pedals or the pedal-cranks operates the brake-spring, and the latter operates directly upon the hub of the sprocket-wheel and upon the hub of the frame through which the pedal-shaft passes, and I thus provide a simple and effective brake and one which is perfectly adapted to accomplish the result for which it is intended, while being entirely concealed from view and being also comparatively inexpensive.

My invention is not limited to the exact form, construction, and arrangement of the various parts thereof as herein described, as it is evident that changes therein and modifications thereof may be made without departing from the spirit of my invention or sacrificing its advantages.

Having fully described my invention, I claim as new and desire to secure by Letters Patent—

The combination with the frame of a bicycle of a hub B, provided with an annular chamber $b$, a pedal-shaft A, having radial shoulder or projection $a$, which extends across said chamber, a sprocket-wheel G, provided with radial outwardly-curved spokes $g$, and a tubular hub $g^2$, one side of which is open, and which is provided on one side with a shoulder $g^4$, which extends outwardly flush with the projection $a$, and an open spring brake-ring within said chamber $b$, one end of which is adapted to press against the projection $g^4$ of the hub, and the other end to rest against the projection $a$ of the shaft, the outer wall of said shoulder $g^4$ being inwardly beveled, all constructed and adapted to operate as set forth.

In testimony that I claim the foregoing as my invention I have signed my name, in presence of the subscribing witnesses, this 19th day of February, 1896.

WILLIAM SCHMIDT.

Witnesses:
C. GERST,
N. J. SUNESON.